United States Patent [19]

Cartensen

[11] Patent Number: 4,988,127
[45] Date of Patent: Jan. 29, 1991

[54] THREADED TUBING AND CASING JOINT

[76] Inventor: Kenneth J. Cartensen, 4540 N. 44th St., No. 70, Phoenix, Ariz. 85018

[21] Appl. No.: 290,843

[22] Filed: Dec. 29, 1988

Related U.S. Application Data

[63] Continuation of Ser. No. 726,605, Apr. 24, 1985, abandoned.

[51] Int. Cl.$^5$ .............................................. F16L 15/04
[52] U.S. Cl. ...................................... 285/94; 285/334; 285/355
[58] Field of Search ................ 285/332.2, 333, 334, 285/355, 390, 94, 332.3, 332; 411/411, 436, 427, 424

[56] References Cited

U.S. PATENT DOCUMENTS

| | | | |
|---|---|---|---|
| 1,927,656 | 9/1933 | Eaton et al. | 285/334 |
| 2,062,407 | 12/1936 | Eaton | 285/334 |
| 2,150,221 | 3/1939 | Hinderliter | 285/333 |
| 2,177,100 | 10/1939 | Frame | 285/334 |
| 2,181,343 | 11/1939 | Reimschissel | 285/333 |
| 2,204,754 | 6/1940 | Frame | 285/334 |
| 2,474,556 | 6/1949 | Stone | 285/355 |
| 2,772,102 | 11/1956 | Webb | 411/414 |
| 2,827,313 | 3/1958 | Conner | 285/355 |
| 2,907,589 | 10/1959 | Knox | 285/355 |
| 2,915,322 | 12/1959 | Dunlop | 285/355 |
| 3,100,656 | 8/1963 | MacArthur | 285/332.2 |
| 3,109,672 | 11/1963 | Franz | 285/334 |
| 3,224,799 | 12/1965 | Bloge et al. | 285/334 |
| 3,468,563 | 12/1969 | Duret | 285/355 |
| 3,572,777 | 3/1971 | Blose | 285/334 |
| 3,811,710 | 5/1974 | Dula et al. | 285/355 |
| 3,850,461 | 11/1974 | Fujioka et al. | 285/332.2 |
| 4,373,750 | 2/1983 | Mantelle | 285/334 |
| 4,377,302 | 3/1983 | Kohyama et al. | 285/390 |
| 4,384,737 | 5/1983 | Reusser | 285/334 |
| 4,398,756 | 8/1983 | Duret | 285/334 |
| 4,458,925 | 7/1984 | Raulins et al. | 285/332.2 |
| 4,508,375 | 4/1985 | Patterson et al. | 285/334 |
| 4,522,431 | 6/1985 | Reimert | 285/334 |
| 4,525,287 | 6/1985 | Carstensen | 252/26 |
| 4,527,815 | 7/1985 | Frick | 285/94 |
| 4,550,937 | 11/1985 | Duret | 285/334 |
| 4,706,997 | 11/1987 | Carstensen | 285/55 |

FOREIGN PATENT DOCUMENTS

| | | | |
|---|---|---|---|
| 48411 | 11/1984 | PCT Int'l Appl. | 285/334 |
| 557499 | 12/1974 | Switzerland | 285/355 |
| 365325 | 1/1932 | United Kingdom | 285/355 |

Primary Examiner—Eric K. Nicholson
Attorney, Agent, or Firm—Merchant, Gould, Smith, Edell, Welter & Schmidt

[57] ABSTRACT

A power thread comprising a tubing or casing connection having a collar threadably connected to a tubular member at each end is disclosed, utilizing a shallow tapered thread with relatively low crest height. The device has a number of closely mated threads adjacent the inserted end of the tubular member and diminishing but still load bearing engagement of the remaining threads. In one example of a five thread buttress according to the invention, the root to crest dimension of the thread profile is about 0.040" and the thread profile has a taper of about 0.040" per inch. The load flank side of the thread on the tubular member and coupling has about a 3° angle and the stab flank side of the thread has about a 10° angle, relative to a plane perpendicular to the central axis. The crest surface of the threads on the collar and tubular member have a taper of about 1.75° from the approximate midregion of the crest surface to the stab flank. High temperature resistant elastomeric seal rings are disposed in grooves within the coupling and the threaded surface has surface indentations therein for reception of solid particular lubricants.

25 Claims, 2 Drawing Sheets

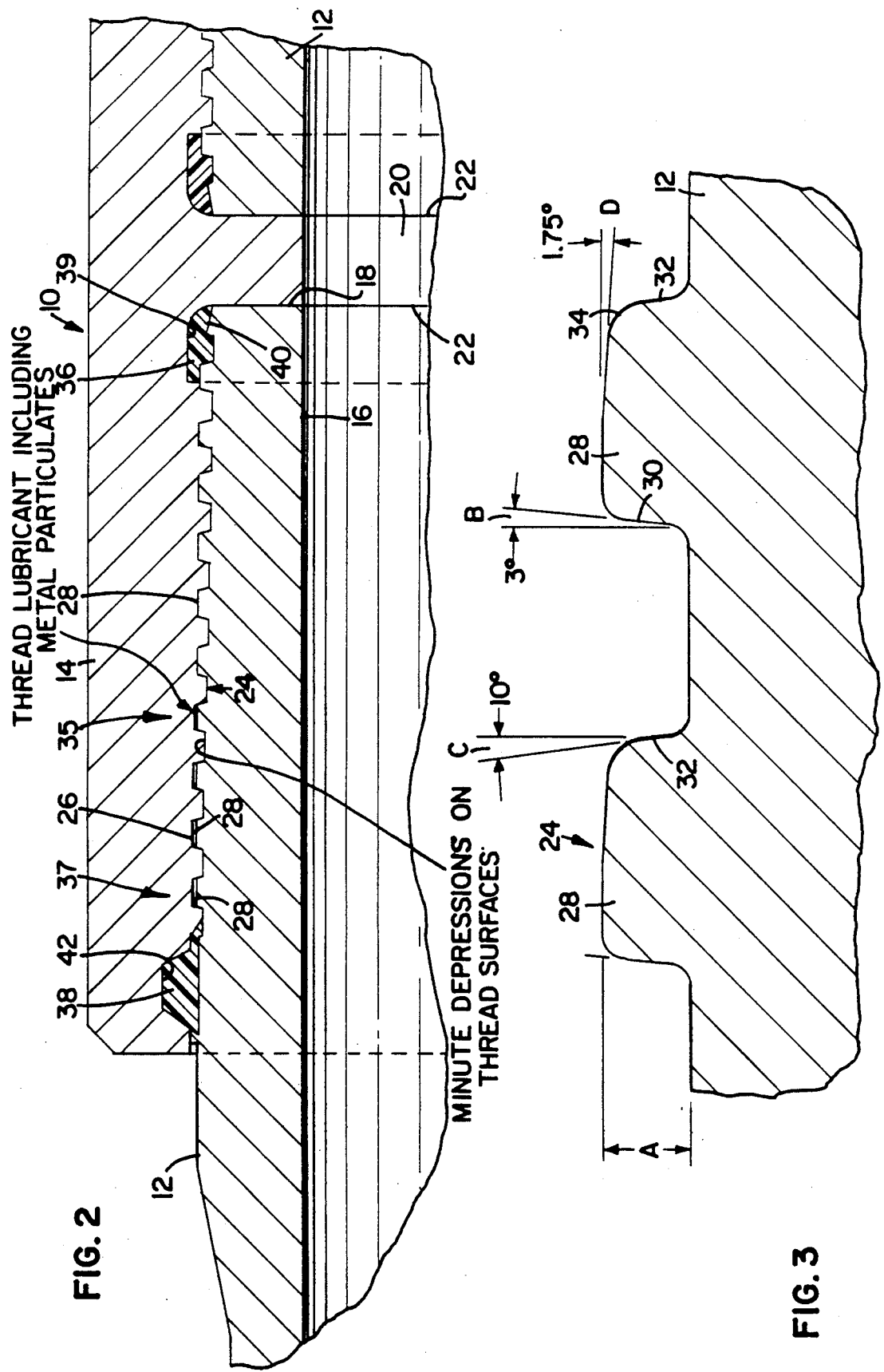

THREADED TUBING AND CASING JOINT

This is a continuation of application Ser. No. 726,605, filed Apr. 24, 1985 now abandoned.

BACKGROUND OF THE INVENTION

This invention relates to threaded joints and is particularly relates to power threads, such as five thread buttress joints for oil well tubing, casing and the like.

For modern demanding oil field use, pipe coupling systems must satisfy a number of often conflicting requirements. Thus, efficient oil well tubing and casing joints must provide a very good seal against the high pressures encountered both from inside and outside sources (particularly in deep wells), and have structural integrity, as well as good tensile and torsion force absorption characteristics. It is particularly important for reduction of costs in field use that the pipe couplings can be made and broken repeatedly, without galling or other damage to the threads.

Couplings for tubing and casing in critical oil field applications are often based on the "five thread buttress" A.P.I. standard, so-called because it has five threads per inch. These are referred to as power threads because they are more capable of handling high loads than other standard threads, such as A.P.I. round. The buttress thread is characterized by a generally rectangular profile with a stab flank on the side of the pipe that enters the coupling, a load flank on the opposite side which is to absorb the load in tensile, and an approximately flat crest. The standard A.P.I. five thread buttress has a 0.060" height and a taper of ¾ inch per foot, which is 0.0625" per inch of length. The metal usually employed is that suited for the more demanding applications, typically being of high alloy stainless steel or 9% to 13% chrome alloys with carbon steel. Such materials, however, are particularly subject to galling because of their frictional characteristics. In practice galling can appear on 50% to 90% of the connections in a string where such materials are used. Despite the fact that these tubular products are initially more expensive, therefore, they are disproportionately more expensive because of field service problems.

U.S. Pat. No. 3,109,672 to Franz is representative of prior art patents relating to buttress type couplings. This patent points up the problems of galling, poor repeated make-up characteristics of tubing joints and the hoop stress problems in the coupling. The design of the tapered buttress joint described and shown in the Franz patent is particularly characterized by low hoop stress in the end of the coupling. Other examples of prior art threaded tube joints employing buttress threads are given in U.S. Pat. Nos. 3,224,799; 2,062,407; 2,177,100; 2,006,520; 2,772,102 and 3,989,284. However, in most cases these joints have not been found practical for use in modern oil field technology for various reasons, such as being readily subject to damage, excessive galling, leakage and high cost. The buttress thread is widely used but as noted practical difficulties remain in a number of respects. There is still a need therefore for a tubing and casing joint particularly suited for demanding oil well applications which has high tensile strength, and excellent sealing characteristics, which is essentially free from galling during repeated make-up and break-out operations, and which imposes no added cost because of design complexities.

SUMMARY OF THE INVENTION

A power thread in accordance with the invention, and one which is particularly well adapted to demanding oil field and other coupling systems, satisfies the multiple conflicting requirements of modern applications by a novel approach starting with a shallow tapered thread that has relatively low crest height. In association with this geometry the coupling incorporates non-interfering but closely mated threads that are configured to distribute loads across the threads, have limited clearance without binding, and be highly resistant to bending deformation.

This coupling provides significant wall thickness at the inserted end of the tubular member and an average wall thickness for the coupling that is at least as great as that for the tubular member. The configuration functions virtually without galling, despite multiple make-ups and break-outs of high alloy members, and provides high tensile and torsion strength, excellent sealing and resistance to damage. A vanishing taper of the threads on the crests of the pin or tubular member functions to absorb the load by spreading it out to achieve efficient tensile strength. The engaging thread surfaces incorporate minute depressions in which thread lubricant becomes entrapped, facilitating relative movement without galling despite the virtually zero clearance that is used.

In a particular example, a coupling system in accordance with the invention employs a 0.040" per inch taper and a 0.040" thread height in a five thread per inch buttress type profile. The taper of the crest of the threads on the tubular member varies near the shallow end to preserve wall thickness. The thread profile provides a load flank at almost a 90° angle, and a stab flank at about an 80° angle, the thread crest height decreasing slightly from the midregion of the crest to the stab flank. The inserted end of the tubular member is thick and flat ended, lying in a plane at 90° to the longitudinal axis. In a preferred example, the nose of the inserted end engages against a center reference ring in the coupling member for a metal-to-metal seal. Additionally, center grooves and end grooves at the termini of the threaded regions in each part of the coupling member receive elastomeric seal rings which are activated by the inserted tubular member and isolate the threaded regions from both internal and external pressures. With this arrangement, the tubular member is not a weak link in the system, stress risers are avoided, and the coupling can be used in high tensile load and corrosive pressurized fluid conditions.

Beyond the midpoint of the tublar member or pipe, the height of the thread on the pipe diminishes, leaving more of an opening between the crest of the threads on the pipe and the root of the threads on the coupling in this threaded region. This variation aids in avoiding galling and binding, but does not adversely affect load bearing properties. Further, because of the flatter taper, there is less interference, and becasue of less interference, less torque is required for makeup.

A much closer fit is provided as compared to prior art tubing joints but such closer fit does not cause binding. In preferred practice the surface of the threads is sand blasted to provide minute depressions in the metal. These depressions are filled with a metallic lubricant such as one containing indium which fuses to the metal and facilitates making and breaking without galling, even through clearance is virtually zero at the fully formed threads. At the same time, this provides the necessary fit for closure of any leak path through the complete helix of full formed threads. The intimate contact over the full form of the thread eliminates point loads and the resulting high hertzian stresses which cause galling.

Another feature of the design of the tubular joint of the invention is that a fade-off is provided in the midregion of the thread from the crest and which curves down onto the stab flank. This fade-off also aids in preventing binding and galling.

BRIEF DESCRIPTION OF THE DRAWINGS

A better understanding of the invention may be had by reference to the following description, taken in conjunction with the accompanying drawings in which:

FIG. 2 is an enlarged longitudinal section view of the buttress joint of FIG. 1; and FIG. 3 is an enlarged cross sectional detail of the buttress thread in the device of FIG. 2.

DETAILED DESCRIPTION OF THE INVENTION

Figure 1:
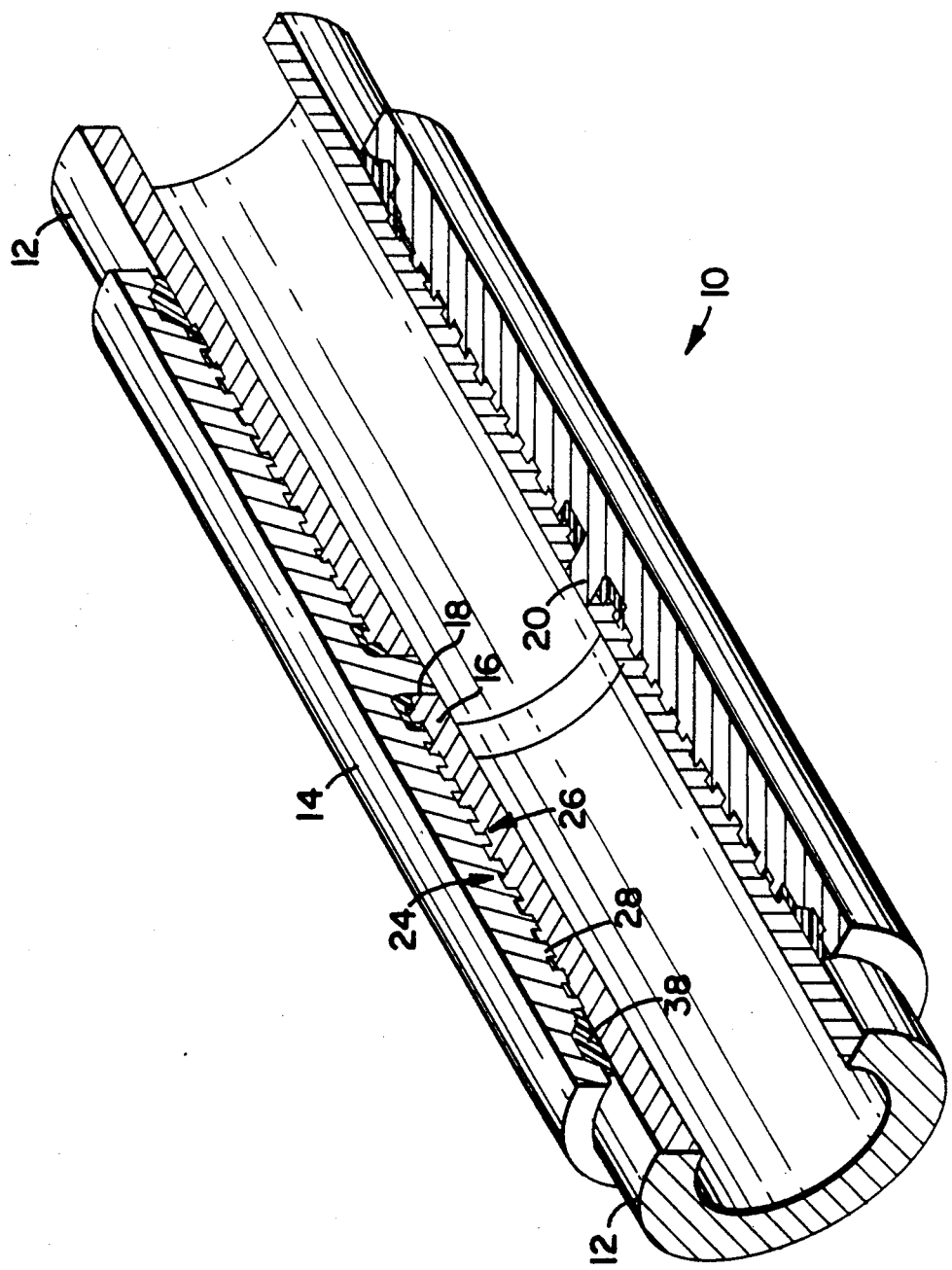
FIG. 1 is a longitudinal perspective view, broken away, of a tapered five thread buttress joint according to the invention.

Referring to FIGS. 1 and 2 of the drawings, a coupling 10 includes a section of tubing or casing comprising a pin or tubular member 12 threaded into a box or collar 14. In this example the pin 12 is depicted as having an upset end, but any standard configuration may be used. The pin 12 has a nose end 16 terminating in a flat face 18 perpendicular to the longitudinal axis of member 12. The collar 14 includes a central ring 20 within the collar 14 having reference faces 22 perpendicular to the central axis thereof and in face-to-face engagement with the nose ends of the pins 12.

The pin 12 has a tapered buttress thread profile 24 on the external surface thereof terminating at the nose end 16; and the collar 14 has a mating tapered buttress thread 26 on the internal surface thereof on both sides of the ring 20. These internal threads 26 in the collar 14 terminate at the opposite ring faces 22. The pin 12 is threaded into the collar 14 until the inner flat face 18 of the pipe 12 engages the flat reference face 22 of the central ring 20 on the collar 14.

The tapered threads 24 and 26 have a substantially rectangular thread profile 28, as best seen in FIG. 3, with a root to crest dimension A of approximately 0.040", and nominally 0.040"±0.005", there being five threads per inch.

The sides of the threads 28 define a load flank 30 and a stab flank 32 is on that side of the thread 28 of the pin 12 that enters the collar 14 and the load flank 30 is on the opposite side of the thread 28 and absorbs the loads in tensile. The load flank side 30 has a 3° angle B relative to a plane perpendicular to the central axis, this being the principal load bearing surface of the thread. The stab flank side 32 of the tapered thread 28 has an angle C of approximately 10° relative to a plane perpendicular to the central axis. Because this side of the thread is not load bearing, it has a greater angle relative to the perpendicular to facilitate entry of the pin 12 into the collar 14.

There is a fade-off or taper D of less than 2°, preferably 1.75°, on the crest surface of the threads 28 on the collar 14 and tubular member 12 from a point approximately in the midregion of the crest surface and which curves downwardly as indicated at 34 onto the stab flank side 32 of the thread. Thus the crest height diminishes at the approximately 1.75° angle from the approximate center of the crest to the stab flank. A rounded corner 34 between the stab flank 32 and the thread crest of this example has an approximately 0.020" radius.

It will be seen in FIG. 2 that the root to crest dimensions of the threads 28' of the pin 12 diminish from the approximate midregion 35 thereof to the last thread region at 37, while the root taper remains the same. The minimum height crest of the thread at the outer end of the threaded region 37 on the tubular member has approximately 50% bearing surface depth against the load flank of the opposed thread on the collar 14. The threaded surfaces of the pin 12 and collar 14 engage with substantially zero clearance adjacent the inserted end 16 of the pin 12 and the load flanks bear diminishing amounts of tensile load progressing to the opposite end of the threaded portion. That is, the threads closest to the nose end of the pin or pipe 12 have substantially zero clearance between the roots and crests of opposing faces to about the midregion of the threaded length, and the depths of the threads on the pin 12 diminish from the midregion to the opposite end of the threaded region of member 12. Such design leaves more of an opening at the rear of the threaded region and aids in avoiding galling and binding. The average wall thickness of the pin 12 is at least as great as the average wall thickness of the collar 14 throughout the threaded region.

The closer fit that is provided, compared to prior art tubing joints, does not cause binding. Preferably, the surfaces of the tapered threads 24 and 26 are sandblasted to provide minute depressions, no greater than 1 mil in depth. A metallic lubricant, such as one containing indium, is applied to the threads to fill the minute depressions when the coupling has been made up. The indium fuses to the metal and facilitates making and breaking without galling while providing the necessary fit for closure of any leak path through the complete helix.

The standard five thread buttress pipe of A.P.I. has a root to crest dimension of about 0.060" and also a fairly steep thread taper of 0.0625"/inch. In comparison, the present configuration has a thread profile of only about 0.040" and a thread taper of about 0.040"/inch. By use of a combination of low thread profile, low degree of taper, relative low stab angle, and thread fade-off with rounded corners between the crest and stab flank, a much closer fit of pin 12 and collar 14 is usable without causing binding, in contrast to the prior art tube joints. Further, the flatter taper of the thread profile of the tube joint of the present invention reduces the tendency of the profile of the thread to gall because it can penetrate further without damage. By using a lower thread height and shallower taper, the stress is more uniformly distributed among the different threads, in addition to providing a much improved metal-to-metal contact. There is thus provided an improved seal, together with structural integrity and reduced galling problem, permitting threading of the pipes into the couplings repeatedly, and repeated break-outs, without damage. It was unexpected that in the design of the device of the present application, having reduced taper and reduced thread height, better load absorption properties would be achieved.

There is also provided a first seal ring 36 disposed between the pin 12 and the collar 14 at the reference faces 18 of the central ring 20, and a second seal ring 38 disposed between the pin 12 and the collar 14 adjacent each coupling end. The first seal ring 36 is disposed in a groove or recess 39 in the collar 14 adjacent the reference face 18 of the ring 20. For this purpose a portion of the last thread 40 on the pin 12 is cut down so that the crest of the last thread has about a 15° taper. The second seal ring 38 is disposed in a second groove or recess 42 adjacent the end of the collar 14. A like pair of inner and outer seal rings are disposed in the collar 14 on the opposite side of the central ring 20 and function in like manner. It will be noted that the grooves or recesses 39 and 42, which receive the seal rings 36 and 38, respectively, are disposed completely within the collar 14 and do not cut into the pin or tubing 12. This avoids reducing the strength of the pipe or pin 12, which is the part that usually fails in service. The seal rings 36 and 38 are composed of a high temperature resistant elastomeric material, preferably the material marketed as PTFE, a fluoroelastomer based on the copolymer of vinylidene fluoride and hexafluoropropylene.

The pins 12, when inserted within the collar 14 to butt against the reference ring 20, activate the seal rings 36, 38 to cause them to conform to the surface profiles of the adjacent members, as best seen in FIG. 2. The seal rings 36, 38 thus seal off both ends of the threaded region to protect against high internal or external pressures penetrating between the threads and seeking to deform a pin 12 and collar 14 differentially. These seals thus cooperate with the power thread arrangement to render the instant five thread buttress suitable for extremely demanding applications.

The tubing connection of the present invention has been employed in practice on the production string in high pressure wells, with the assurance of good sealing and consistent make-up at competitive cost.

Since various changes and modifications of the invention will occur to and can be made readily by those skilled in the art without departing from the invention concept, the invention is not to be taken as limited except by the scope of the appended claims.

What is claimed:

1. A thread combination for joining a fluid hydrocarbon products casing or tubing having a nose end to a fluid hydrocarbon products collar, wherein the casing or tubing and collar each comprises:
    a plurality of male threads on said fluid hydrocarbon products casing or tubing and a plurality of female threads on said fluid hydrocarbon products collar, said male and female threads selected to be threadedly engageable, said male and female threads further selected to be threads having a thread density of about five threads per inch;
    said male and female threads having a substantially rectangular thread profile having nominal root to crest dimension of substantially less than 0.060" and a taper of substantially less than 0.0625" per inch;
    said male and female threads being dimensioned to have substantially zero clearance between a number of mating threads for a predetermined length from the nose end of each different tubing or casing;
    wherein the tubing or casing has a nose end terminating in a flat face perpendicular to the longitudinal axis thereof; and
    wherein the collar includes central ring means having reference faces perpendicular to the central axis thereof, each reference face being in face-to-face engagement with the nose end of a different tubing or casing.

2. The thread combination of claim 1, wherein the device further includes first seal means disposed between each tubing or casing and the collar adjacent the reference faces and second seal means disposed between each tubing or casing and the collar adjacent each collar end.

3. The thread combination of claim 1, wherein the average wall thickness of the tubing or casing is at least as great as the average wall thickness of the collar.

4. The thread combination of claim 1, wherein the threads closest to the nose end of the tubing or casing have substantially zero clearance relative to the roots and crests of opposing faces of the thread on the collar to about the midregion of the threaded length of tubing or casing, and the depths of the threads on the tubing or casing diminish from the midregion thereof to the opposite end of the threaded region of the tubing or casing from the nose end of the tubing or casing.

5. The thread combination of claim 1, wherein the threads have a surface finish including minute depressions of no greater than 1 mil in depth and wherein the combination also includes thread lubricant having metal lubricant particulates impressed into the minute depressions.

6. The thread combination of claim 1, wherein the thread profiles have a load flank surface on one side and a stab flank surface on the other side, and wherein the crest height diminishes at an approximately 1.75° angle from the approximate center of the crest to the stab flank.

7. The thread combination of claim 2, said seal means being disposed in recesses in the coupling and wherein the first seal means and the second seal means are seal rings formed of a high pressure and temperture resistant elastomeric material and the first seal means engage into the threaded region between the male threads and female threads adjacent the reference surface and the second seal means engage into the threaded region between the male threads and female threads adjacent each collar end.

8. The thread combination of claim 7, wherein the threads closest to the nose end of the tubing or casing have substantially zero clearance relative to the roots and crests of opposing faces of the thread on the collar to about the midregion of the threaded length of the tubing or casing, and the depths of the threads on the tubing or casing diminish from the midregion thereof to the opposite end of the threaded region from the nose end, the thread profile having a load flank surface on one side and a stab flank surface on the other side, and wherein said load flank surface has an angle of approximately 3° relative to a plane perpendicular to the central axis and the stab flank surface has an angle of approximately 10° relative to a plane perpendicular to the central axis.

9. The thread combination of claim 8, wherein the crest height of the thread profile diminishes at an approximately 1.75° angle from the approximate center of the crest to the stab flank.

10. In a fluid hydrocarbon products tubing or casing connection having a fluid hydrocarbon products collar threadedly connected to a tubular member at each end of the collar, a thread configuration comprising:
    a plurality of male threads on said fluid hydrocarbon products casing or tubing and a plurality of female threads on said fluid hydrocarbon products collar, said male and female threads further selected to be threads having a thread density of about five threads per inch;

said male and female threads having a substantially rectangular thread profile with a root to crest dimension being substantially less than 0.060" and the sides of the threads defining load flanks and stab flanks, the height of the crest of the thread profile diminishing slightly from the midregion to the tab flank side, the thread profile having a taper of substantially less than 0.0625" per inch and the average wall thickness of the collar being at least as great as the average wall thickness of the tubular members throughout the threaded region, the root to crest dimensions of the threads in the tubular members diminishing from the approximately midregion thereof to the end of the threaded region opposite the end inserted in the collar while the root taper remains the same, the root to crest dimensions being such on each of the casing or tubing and the collar that the threaded surfaces engage with a close fit giving substantially zero clearance from adjacent the inserted end of the tubular members to a predetermined midregion of the thread and wherein the load flanks bear diminishing amounts of tensile load to the opposite end.

11. The connection as set forth in claim 10, wherein the minimum height crest at the end of the threaded region opposite the inserted end of the tubular member on the tubular members has approximately 50% bearing surface depth against the load flank of the opposed thread on the collar, and wherein the crest surface of the threads on the collar and tubular members have a taper of less than 2° from the approximate midregion thereof to the stab flank side.

12. The connection, as set forth in claim 11, wherein the threaded surfaces have surface indentations therein for reception of solid particulate lubricants and wherein the load flanks have an angle of approximately 3° relative to the central axis, wherein the stab flanks have an angle of approximately 10° relative to the central axis, and wherein the corner between the stab flank and crest has an approximately 0.020" radius.

13. The connection as set forth in claim 12, the crest height having a taper of approximately 1.75° from the approximate midregion of the crest to the stab flank side.

14. A threaded coupling system providing sealing at high pressures, resistance to galling and damage during repeated make-up and break-out and having high tensile strength, including an externally threaded tubing member and an internally threaded collar, said tubular member having a nose end and said collar including central ring means having opposing faces in face-to-face engagement with the nose ends of tubular members threaded in from opposite ends, said system comprising:

a thread profile with a crest height substantially less than 0.060" and a taper substantially less than 0.0625" per inch;

wherein the threads closest to the nose end of the tubing member are configured with dimensions maintained within ±0.0005" with respect to the mating roots and crests of opposing faces of the thread on the collar, also maintained within ±0.0005", to have substantially zero clearance to about the midregion of the threaded length of the tubing member, and the depths of the threads on the tubing member diminish from the midregion to the opposite end of the threaded region of the tubing member from the nose end of the tubing member and thereafter the root to crest dimension of the threads on the tubing member decreases and the root to crest dimension of the threads on the collar remains constant;

the thread profile having a load flank surface on one side and a stab flank surface on the other side, said load flank surface having an angle of approximately 3° relative to a plane perpendicular to the central axis and the stab flank surface having an angle of approximately 10° relative to a plane perpendicular to the central axis, and wherein the threaded surfaces have minute surface indentations therein of no greater than 1 mil in depth for reception of solid particular lubricant, and wherein the average wall thickness of the tubing member is at least as great as the average wall thickness of the collar.

15. The threaded coupling system of claim 14, said thread profile having a nominal root to crest dimension of approximately 0.040" and a taper of approximately 0.040" per inch, there being five threads per inch, and wherein the crest height diminishes at an approximately 1.75° angle from the approximate center of the crest to the stab flank.

16. The threaded coupling system of claim 15, including first elastomeric ring seals disposed between the tubing member and the collar adjacent the opposing faces of the central ring means and second elastomeric ring seals disposed between the tubing member and the collar adjacent each collar end, said ring seals being disposed in recesses in the collar.

17. The coupling system of claim 16, wherein the crest height diminishes at an approximately 1.75° angle from the approximate center of the crest to the stab flank.

18. A combination according to claim 1 wherein said nominal root to crest dimension is approximately 0.040".

19. A combination according to claim 1 wherein said taper is approximately 0.040" per inch.

20. A connection according to claim 10 wherein said root to crest dimension is about 0.040".

21. A connection according to claim 10 wherein said taper is approximately 0.040" per inch.

22. A combination according to claim 18 wherein said dimension is maintained ±0.0005".

23. A combination according to claim 19 wherein said taper is maintained ±0.0005".

24. A connection according to claim 20 wherein said dimension is maintained ±0.0005".

25. A connection according to claim 16 wherein said taper is maintained ±0.0005".

* * * * *

UNITED STATES PATENT AND TRADEMARK OFFICE
CERTIFICATE OF CORRECTION

PATENT NO. : 4,988,127

DATED : January 29, 1991

INVENTOR(S) : Kenneth J. Carstensen

It is certified that error appears in the above-identified patent and that said Letters Patent is hereby corrected as shown below:

Column 1, line 8, after "and" strike "is". Column 3, line 20, "section" should read --sectional--; line 53, after "32" insert --. The stab flank 32--. Column 4, line 47, "relative" should read --relatively--.

Signed and Sealed this

Fourteenth Day of July, 1992

*Attest:*

DOUGLAS B. COMER

*Attesting Officer*  Acting Commissioner of Patents and Trademarks